United States Patent [19]

Tamura et al.

[11] Patent Number: 4,788,578

[45] Date of Patent: Nov. 29, 1988

[54] APPARATUS FOR PREPARING MOUNTING SHEET OF ORIGINALS TO BE SCANNED

[75] Inventors: Junichi Tamura, Tokorozawa; Yuji Homma, Tsurugashima, both of Japan

[73] Assignee: Dai Nippon Insatsu Kabushiki Kaisha, Tokyo, Japan

[21] Appl. No.: 876,750

[22] Filed: Jun. 20, 1986

[30] Foreign Application Priority Data

Jun. 24, 1985 [JP] Japan .................................. 60-137434
Nov. 30, 1985 [JP] Japan .................................. 60-270503
Mar. 14, 1986 [JP] Japan .................................... 61-56614

[51] Int. Cl.4 .............................................. H04N 1/00
[52] U.S. Cl. ..................................... 358/256; 358/280; 364/525
[58] Field of Search ............... 358/256, 280, 294, 293; 364/585; 382/47

[56] References Cited

U.S. PATENT DOCUMENTS 4,327,380 4/1982 Yamada et al. ..................... 358/256
4,338,636 7/1982 Yamada et al. ..................... 358/256
4,495,521 1/1985 Nagoh ................................. 358/256
4,679,095 7/1987 Kitamura ............................ 358/256
4,679,155 7/1987 Mitsuka .............................. 358/256
4,684,999 8/1987 Sakakibara ........................ 358/256

Primary Examiner—Edward L. Coles, Sr.
Attorney, Agent, or Firm—Parkhurst, Oliff & Berridge

[57] ABSTRACT

An apparatus prepares a mounting sheet of originals upon which are drawn the original positioning or arrangement lines and an area to be trimmed. When originals are pasted on the sheet and scanned by a scanner, the picture data of an original is read out. In this apparatus, a magnification, a position and a direction of an original can be entered or inputted on a data tablet and in response to the input data, a mounting sheet is automatically prepared. An operator pastes a original along the original positioning or arrangement lines on the mounting sheet and a picture in the trimmed area is scanned. Furthermore, the apparatus automatically selects an optimum drum of a scanner depending upon the magnification of each original.

15 Claims, 11 Drawing Sheets (a)

(b)

| INTERSECTION NUMBER | X COORDINATE | Y COORDINATE |
|---|---|---|
| 1 | 50 mm | 50 mm |
| 2 | 50 | 150 |
| 3 | 50 | 150 |
| 4 | 50 | 200 |
| 5 | 50 | 250 |
| 6 | 120 | 50 |
| ⋮ | ⋮ | ⋮ |
| 30 | 400 mm | 250 mm |

(74 brackets rows 1–30; table labeled 80)

FIG. 13

| | | | |
|---|---|---|---|
| 0 | 1 | A SCANNER | |
| 2 | 3 | B SCANNER | |
| 4 | 5 | — | |
| 6 | 7 | — | |
| 8 | 9 | — | |
| ORIGINAL NUMBER | MAGNIFI-CATION | PROCESS | — |
| C | INPUT | OUTPUT | — |

FIG. 14

| INPUT - OUTPUT SCANNER | MAGNIFICATION (%) | ANALYZING DRUM | SIZE OF ORIGINAL MOUNTING SHEET (mm) LENGTH × WIDTH |
|---|---|---|---|
| A SCANNER | 30 ~ 200 | LARGE - SIZED | 300 × 350 |
| | 201 ~ 600 | MEDIUM - SIZED | 220 × 350 |
| | 601 ~ 1600 | SMALL - SIZED | 70 × 100 |
| B SCANNER | 25 ~ 300 | LARGE - SIZED | 350 × 400 |
| | 301 ~ 1500 | SMALL - SIZED | 100 × 150 |

(a)

(b)

94

| 95 | ORIGINAL NUMBER |
| 96 | MAGNIFICATION |
| 97 | ORIGINAL CONTOUR DATA |
| 98 | TRIMMING DATA |

99:
| 0 | 1 | 2 | 3 |
| 4 | 5 | 6 | 7 |
| 8 | 9 | • | CR |

APPARATUS FOR PREPARING MOUNTING SHEET OF ORIGINALS TO BE SCANNED

BACKGROUND OF THE INVENTION

The present invention relates to an apparatus for preparing a copy mounting sheet which is used in order to accomplish color separation of various originals by a scanner or especially by an electronic page make-up system.

Recently an electronic page make-up system which accomplishes color separation of an original by a scanner and synthesizes a picture data of one page of a printed sheet by the computer processing has been widely used in the printing industry. The electronic page make-up system is connected to a computer capable of paging and the picture data read out by the scanner is applied to the computer which in turn processes it for a page makeup and delivers its output data to the scanner.

FIG. 1 is a schematic view illustrating the construction of a conventional electronic page make-up system. Reference numeral 160 designates a make-up unit; 170, a tablet digitizer; and 180, a scanner. As shown in FIG. 1, the make-up unit 160 comprises a computer 161, storages or memories 162 and 163, a display device 164, a joy stick 165 and a keyboard 166, all of which are connected to the computers 161. The tablet digitizer 170 comprises a cursor 171 and an input surface 172 consisting of a base region 173 and menue regions 174. The scanner 180 comprises an input drum 181, an output drum 182, a linear encoder 183, a rotary encoder 184 and two interfaces 185 and 186, which are connected to the computer 161. The computer 161 comprises an input computer, a make-up computer and an output computer (not shown).

With the electronic page make-up system of the type described, the process for editing the picture data in accordance with various originals, layout sheets and other instructions is accomplished as follows. First, an original is pasted on the input drum 181 of the scanner 180 at an angle indicated on a layout sheet and the position data Px in the X direction read out by the linear encoder 183, the position data Py in the Y direction read out by the rotary encoder 184 and the picture data are applied through the interface 185 to the input computer (not shown) of the computer 161 and then stored in the storage 162. According to a layout sheet (not shown), the picture data is derived from a region slightly greater in area than an actually trimmed region and then accurately trimmed by the output computer (not shown) of the computer 161.

The storage 162 into which are applied the picture data is disconnected from the input computer and is connected to the make-up computer so that the display device 164 displays the picture data stored in the storage 162. An operator observes the picture displayed by the display device 164 and controls, based upon the layout sheet, the joy stick 165 to cause the cursor to move, thereby designating a region to be trimmed or tint block. The keyboard 166 determines a magnification, a color of the surface of a press sheet, a halftone percentage and so on.

These data are stored in the memory 163 so that the memory 163 is disconnected from the make-up computer after readout and then connected to the output computer (not shown) of the computer 161. Then the data stored in the memory 163 is derived through the output computer and the interface 186 so that a page composed image is exposed to a film mounted around the output drum 182 of the scanner 180.

The above-described processes accomplished by the use of the joy stick 165 and the keyboard 166 can be also accomplished by operating the tablet digitizer 170. That is, the layout sheet is set on the base region 173 of the tablet digitizer 170 and the cursor 171 is operated so that the position data of the rough sketch on the layout sheet and various menues selected from the menue regions 174 are inputted.

When the picture data on the original is read out from the input drum 181 of the scanner 180, first the original must be pasted over the input drum 181 at an angle specified in the layout sheet. The process for pasting the original over the cylindrical surface of the input drum 181 is visually accomplished by an operator. More specifically, the operator measures an angle of inclination of a rough sketch on a layout sheet by a protractor and pastes an original over the scanning drum while confirming the angle of the original by the protractor based on the measured angle. As a result, there arises the problems that the process is very cumbersome and that it is impossible to paste an original with an accurate angle.

Next in the page make-up process by the computer 161, a read-in picture image must be accurately trimmed. The trimming process is accomplished by displaying the picture on the screen of the display device 164 and operating the joy stick 165 so that the designation of the positions representative of an area to be trimmed tends to become inaccurate. Furthermore, this process requires a skilled operator and occupies the computer 161 for a long period of time. As a result, there arises the problem that the electronic page make-up system which is very expensive cannot be utilized with a high degree of efficiency.

In addition, the diameters of analyzing drums upon which are pasted the originals vary in several steps depending upon a separation magnification of an original and a mounting sheet of an original which is used when an original is pasted over the analyzing drum must be prepared for a specific drum to be used. It follows therefore that when the mounting sheet is prepared, an original which can be pasted over the analyzing drum of a predetermined size must be selected and a mounting sheet upon which are pasted a group of selected originals must be prepared. Since the original selection process is accomplished based upon a measured magnification, there arises the problem that the process is very cumbersome.

In view of the above, the same applicant proposed a device which measures a magnification by utilizing a magnification measuring instrument capable of projecting an original and which can derive an angle at which an original is pasted as disclosed in detail in Japanese Patent Application No. 59-162108.

However, the device of the type described above cannot designate an area to be trimmed so that the cumbersome trimming process must be accomplished while displaying a figure on the display device 164.

SUMMARY OF THE INVENTION

The present invention was made to overcome the above and other problems encountered in the prior art and has for its object to provide an apparatus which makes it possible to simultaneously obtain a magnification of an original, original positioning or arrangement lines (that is, the lines along which is pasted an original) and an area to be trimmed on predetermined positions on a mounting sheet so that an electronic page make-up system can be operated with a high degree of efficiency.

To the above and other ends, according to the present invention, in an apparatus for preparing a mounting sheet of an originals on which is pasted an original to be read out and which is used in a system in which the picture on the original mounting sheet is read out by a scanner, there are provided means for projecting the image of a picture on an original inserted into an optical system over a layout sheet and coinciding or registering the projected image with a rough sketch on a layout sheet so that a magnification data of the projected image relative to the original is derived; a data tablet for inputting the position data of a reference line on the layout sheet and the projected image; arithmetic control means responsive to the magnification data and the position data for outputting or deriving original positioning or arrangment line data and the data concerning an area to be trimmed; and a sheet output means responsive to the output from said arithmetic control means for outputting or deriving a sheet on which are drawn the original positioning or arrangement lines and the area to be trimmed.

BRIEF DESCRIPTION OF THE DRAWINGS

FIG. 13 is a view used to explain an operation control panel 7 shown in FIG. 2;

FIG. 14 is a view used to explain the specification data of a scanner stored in a memory 23 shown in FIG. 3;

DETAILED DESCRIPTION OF THE PREFERRED EMBODIMENT

A preferred embodiment of the present invention will be described with reference to the accompanying drawings.

Figure 2:
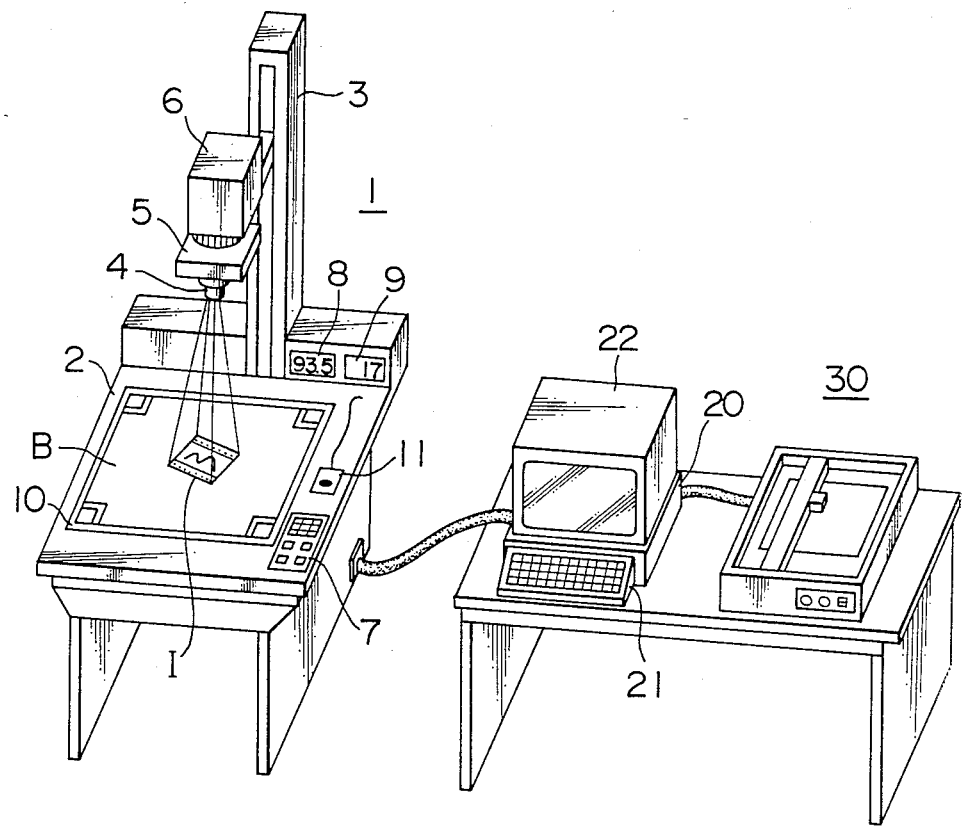
FIG. 2 is a perspective view of an apparatus in accordance with the present invention, illustrating its outer appearance.

FIG. 2 shows the outer appearance of a preferred embodiment of the present invention. Reference numeral 1 designates a magnification measuring instrument; 2, a stand; 3, a column; 4, a projection lens; 5, an original holder; 6, a lamp house; 7, an operation control panel; 8, a magnification indicator; 9, an angle indicator; 10, a data tablet; and 11, a cursor. The magnification measuring instrument 1 is connected to an XY plotter 30 through an arithmetic control device 20 which is connected to a keyboard 21 and a display device 22. B designates a layout sheet; and I, a projected image of a copy set in the original holder 5.

The projection lens 4, the original holder 5 and the lamp house 6 are made into a unitary body which is vertical movable along the column 3. That is, the unitary body moves upward or downward by operating a switch on the operation control panel 7 so that the image of a transparent film is focused on a reduced or enlarged scale at a predetermined position on the layout sheet B. In this case, the distance between the projection lens 4 and the layout sheet B is measured by means of a linear encoder and so processed that a magnification is obtained and displayed on the magnification indicator 8.

It follows therefore that when a transparent film is set into the original holder 5 and when the projected image I is made to coincide with a rough sketch on the layout sheet B, a magnification is automatically indicated by the magnification indicator 8. Thus the magnification measuring process is accomplished. The automatic magnification measuring instrument of the type described is well known in the art.

Figure 3:
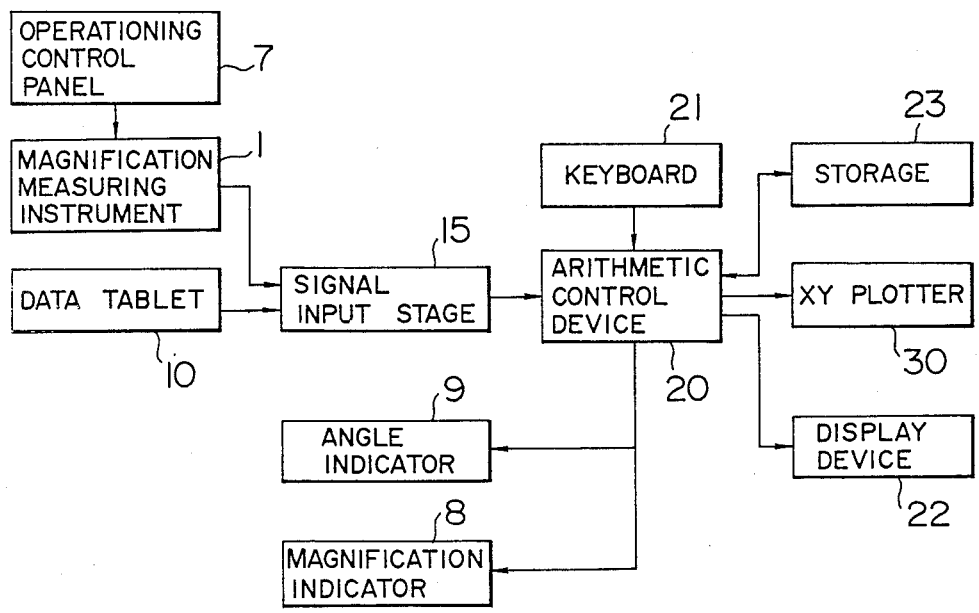
FIG. 3 is a block diagram of a signal processing system in accordance with the present invention.

FIG. 3 is a block diagram illustrating a signal processing system in accordance with the present invention. The data derived from the magnification measuring instrument 1 and the data tablet 10 are applied through a signal input stage 15 to an arithmetic control device 20 whose operation is controlled in response to the operation of ten keys and pushbutton switches on the operation control panel 7 or to the operation of the keyboard 21 so that the driving signal is delivered to the XY plotter 30 and the display signals are applied to the angle indicator 9 and the magnification indicator 8.

Figure 4:
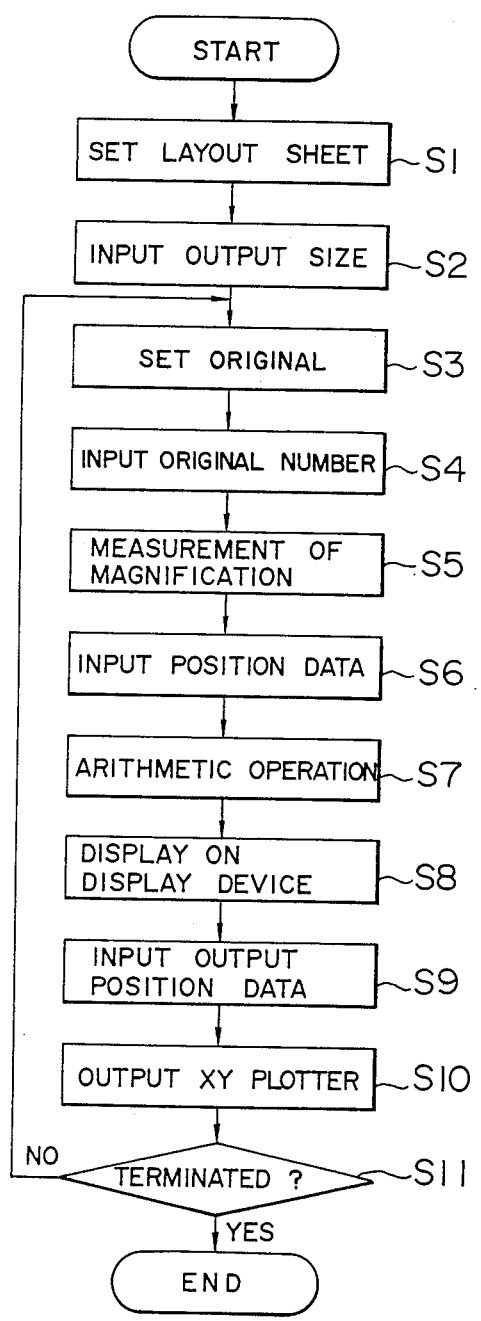
FIG. 4 is a flowchart illustrating a sequence of measurement steps.

Next the magnification and the angular position of an original and the determination of an area to be trimmed will be described below with reference to FIG. 4.

First, a layout sheet B (or a copy thereof) is set on the data tablet 10 on the stand 2(S1) and the size of a mounting sheet to be prepared is inputted (S2). This can be done directly by operating the keyboard 21 so as to enter the size, a predetermined number or symbol for a scanner specified and a kind of a drum. The size of a mounting sheet thus entered or inputted is stored through the arithmetic control device 20 into the memory 23. When the size is not entered or inputted, an output size corresponding to an entered or inputted number or the like is previously stored in the memory 23. Thereafter, an original such as a color film is set into the original holder 5 (S3) so that the image I of the original is focused on the layout sheet B set on the data tablet 10 on the stand 2.

Next the ten keys on the control panel 7 or the keyboard 21 is operated to enter or input the original number (S4) and then the magnification coincidence switch on the operation control panel 7 is operated so that the image I of the original coincides with a rough sketch on the layout sheet B. This is done by displacing the layout sheet B on the stand 2.

Thereafter the magnification display switch on the control panel 7 is operated so that the magnification is displayed by the magnification indicator 8 and is delivered to the arithmetic control device 20 (S5).

As described above, the operations described above are substantially similar to those required for operating a conventional manification measuring instrument and the following step can be eliminated in the case of an original whose angular position is not needed to be specified and which needs no trimming.

Next various position data are delivered to the layout sheet B.

Figure 5:
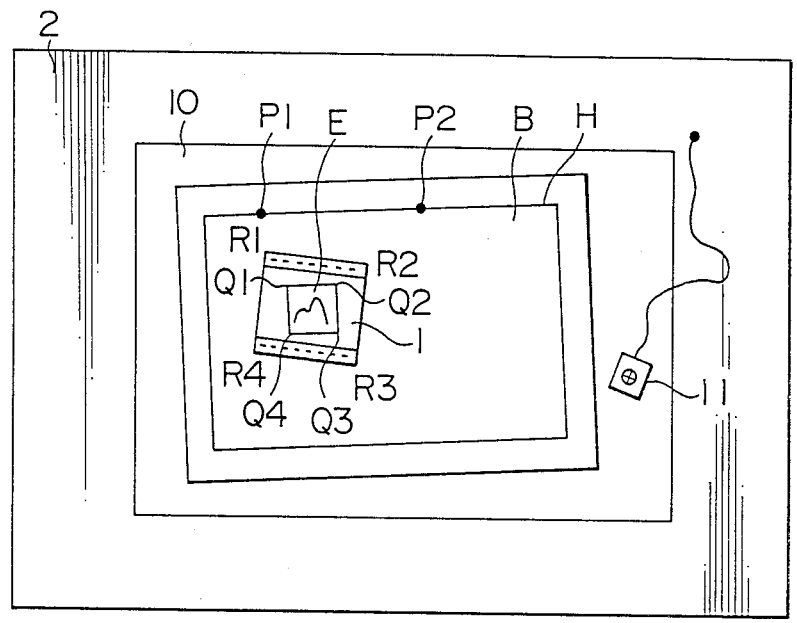
FIG. 5 is a view used to explain the input points on the data tablet 10 shown in FIG. 2.

FIG. 5 is a view used to explain the input points on the data tablet 10. The layout sheet B is placed on the data tablet 10 which in turn is placed on the stand 2 and the layout sheet B has the press sheet outlines H which define a rectangle and a rough sketch E for specifying a layout. The projected image I must coincide with the rough sketch E.

First, the data of the positions P1 and P2 on the press sheet outline H on the layout sheet B are entered or inputted by means of the cursor 11. This press sheet outline H corresponds to a reference line used when an original is pasted on an analyzing drum of a scanner. Next the position data of the vertexes R1, R2, R3 and R4 of a rectangle defined by the projected image I are entered or inputted by means of the cursor 11, then the position data of the vertexes Q1, Q2, Q3 and Q4 of a rectangle which represents an area to be trimmed in the projected image I are entered or inputted by means of the cursor 11. These position data are read in by the arithmetic control device 20 when the operation control panel or the keyboard 21 is operated.

After the position data on the layout sheet B are read in in the manner described above, the arithmetic control device 20 starts processing of the magnification and position data so that the original positioning or arrangement line data and the trimming data are derived (S7) and are stored in the storage 23 while the original positioning or arrangement lines and the trimming lines are displayed on the display device 22 (S8). Concurrently, the angle indicator displays the angle of inclination of the original positioning or arrangement line relative to the reference line; that is, the angular position of the original F.

Figure 7:
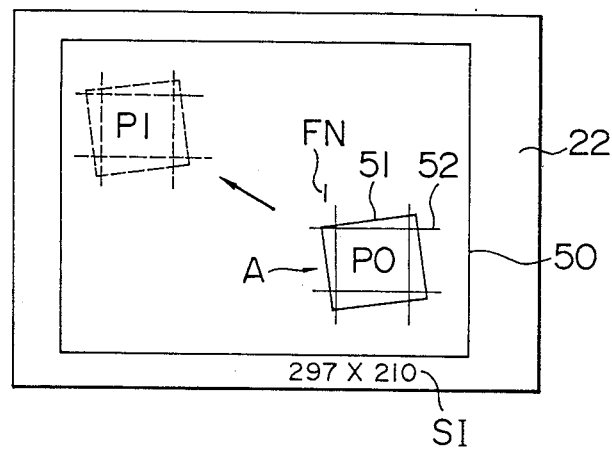
FIG. 7 is a view used to explain a figure displayed on the display device 22 in the step S8 in FIG. 4.

FIG. 7 is a view used to explain the arrangement of the figure displayed on the display device 22. As shown, the outer frame 50 representative of the size of the mounting sheet entered or inputted in the step S2 is displayed on the screen of the display device 22. The figure A defined by the contour lines 51 of the copy and the trimming lines 52 is displayed at a predetermined position PO inwise the outer frame 50. The original number FN which was entered or inputted in the step S4 is displayed at a position in the vicinity of the figure A and the sheet size SI entered or inputted in the step S2 is displayed at the lower right position outside of the outer frame 50. The contour lines 51 are displayed based on the original positioning or arrangment data derived in the step S7 while the trimming lines 52 are displayed based on the trimming data derived in the step S7. The figure A displayed on the display device 22 can be arbitrarily displaced within the outer frame 50 when the cursor displacement key (not shown) on the keyboard 21 is operated. A predetermined position PO is not limited to the lower right corner of the outer frame 50 and may be determined at any suitable position.

Next the keyboard 21 is operated so that the figure A displayed on the display device 22 is displaced to a desired position and then the output position data are entered or inputted (S9). The displacement of the figure A is accomplished by displacing the figure A to the position P1 indicated by the broken lines in FIG. 7. The output position data are stored through the arithmetic operation control device 20 into the storage 23.

When a gage output switch on the operation control panel 7 or the keyboard 21 is operated, the data derived from the storage is delivered to the control circuit of the XY plotter 30 so that the latter plots a figure and consequently a hard copy on which the copy positioning or arrangement lines and the pattern representative of an area to be trimmed are drawn at predetermined positions is obtained (S10).

Thereafter, when the magnification of the original is to be measured, the process is returned from the step 11 to the step 3 and the steps upto the step 10 are accomplished. In this case, in the step 8, the contour lines of the original and the trimming lines whose output positions are derived by the previous operations are displayed on the display device 22. Therefore, the figure displayed at the position PO can be displaced to a desired position in the step 9 with reference to the displayed figure whose output position data is entered or inputted.

When a series of processes are accomplished by repeating the step for measuring the magnification of each of originals in the manner described above or when no space is available on the screen of the display device 22 for displaying a figure in the step 8, the process is terminated (S11).

Figure 6:
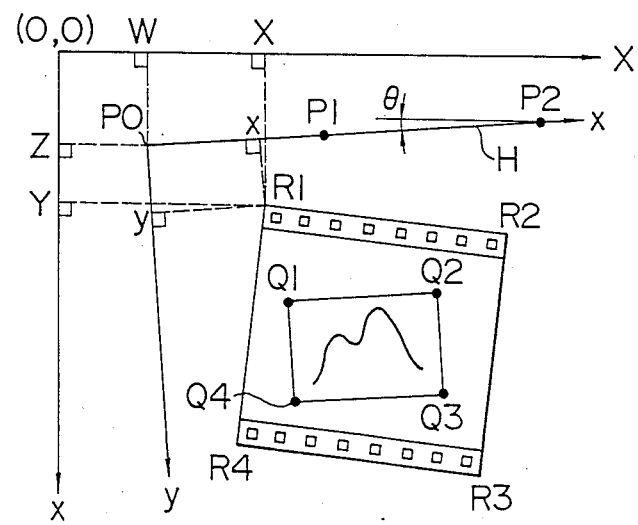
FIG. 6 is a view used to explain the relationships among the input points shown in FIG. 5.

FIG. 6 is a view used to explain the relationships among the points entered or inputted from the data tablet 10 in the step 6 and with reference to FIG. 6 the processes for obtaining the original positioning or arrangement line data and the trimming data in the step 7 will be described in detail hereinafter.

In the X-Y coordinate system shown in FIG. 6, assume that the coordinates of the points P1 and P2 on the press sheet outline H be P1(a, b) and P2(c, d). Then the angle $\theta$ of inclination of the press sheet outline H relative to the X coordinate axis is given by $$\tan\theta = \frac{d-b}{c-a} \quad (1)$$

Next a new x-y coordinate system with the x coordinate axis which coincides with press sheet outline H and the y coordinate axis constructed at right angles to the x coordinate axis at the origin PO(w, z) is constructed.

Then the coordinate transformation from the X-Y coordinate system to the x-y coordinate system can be accomplished as follows.
Since $$X = x \cos\theta + y \sin\theta + w$$

and $$Y = -x \sin\theta + y \cos\theta + z$$

$$\left.\begin{array}{l} x = (X - w)\cos\theta + (z - Y)\sin\theta \\ \text{and} \\ y = (X - w)\sin\theta + (Y - z)\cos\theta \end{array}\right\} \quad (2)$$

From Eq.(1), $$\left.\begin{array}{l} \sin\theta = \dfrac{|d - b|}{\sqrt{(c - a)^2 + (d - b)^2}} \\ \text{and} \\ \cos\theta = \dfrac{|c - a|}{\sqrt{(c - a)^2 + (d - b)^2}} \end{array}\right\} \quad (3)$$

Therefore the coordinates of a given point in the X-Y coordinate system on the data tablet 10 can be transformed into the coordinates in the x-y coordinate system by using Eqs. (2) and (3). For instance, assume that the point R1 in the X-Y coordinate system has the coordinates (XR1, YR1) and has the coordinates (xR1, yR1) in the x-y coordinate system. Then $$xR1 = (XR1 - w)\dfrac{|c - a|}{\sqrt{(c - a)^2 + (d - b)^2}} +$$

$$(z - YR1)\dfrac{|d - b|}{\sqrt{(c - a)^2 + (d - b)^2}}$$

and $$yR1 = (XR1 - w)\dfrac{|d - b|}{\sqrt{(c - a)^2 + (d - b)^2}} +$$

$$(YR1 - w)\dfrac{|c - a|}{\sqrt{(c - a)^2 + (d - b)^2}}$$

In like manners all the coordinates of the points R2–R4 and Q1–Q4 in the x-y coordinate system can be obtained.

Next the coordinates required for cause the XY plotter to draw a figure are obtained from these coordinates described above.

Assume that the magnification obtained in the abovedescribed magnification measuring process be m; the coordinates obtained from the above-described calculations be (x, y); and the coordinates in the drawing coordinate system be (Dx, Dy). Then $$\left.\begin{array}{l} Dx = (1/m)x \\ Dy = (1/m)y \end{array}\right\} \quad (4)$$

Therefore, the drawing coordinates required for the XY plotter for drawing a pattern are obtained from Eqs. (2), (3) and (4).

Figure 8:
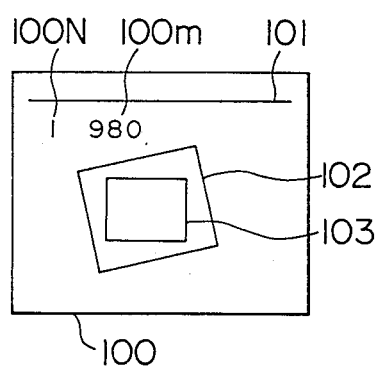
FIGS. 8(a) and (b) are views used to explain the original positioning or arrangement lines and trimming lines derived in the step S10 in FIG. 4 and drawn on sheets.
Figure 8:
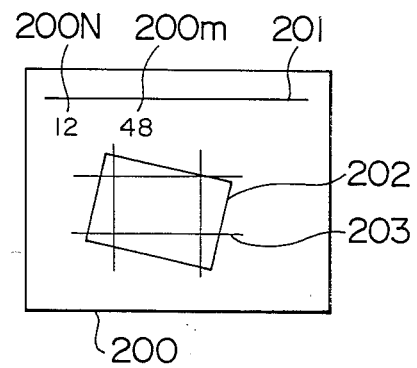

FIGS. 8(a) and (b) are views used to explain the original positioning or arrangement lines and the trimming lines derived in the step 10 and drawn on various sheets.

FIG. 8(a) shows a transparent sheet 100 upon which are marked a reference line 101 corresponding to the press sheet outline along one side of the sheet 100 and the original number 100N and the magnification 100 m. The original positioning or arrangement lines 102 which define a rectangle are drawn at the center portion of the transparent sheet 100 and the trimming lines 103 which define a rectangle to be trimmed are marked inside the rectangle defined by the original positioning or arrangement lines 102.

FIG. 8(b) shows an opaque sheet 200 upon which are marked a reference line 201, an original number 200N, a magnification 200 m and original positioning or arrangement lines 202 which define a rectangle as in the case of the transparent sheet 100 shown in FIG. 8(a). The trimming lines 203 are extended beyond the positioning or arrangement lines 202 because after the opaque sheet 200 is cut off along the original positioning or arrangement lines 202, an original is set into the cut-off portion.

Figure 9:
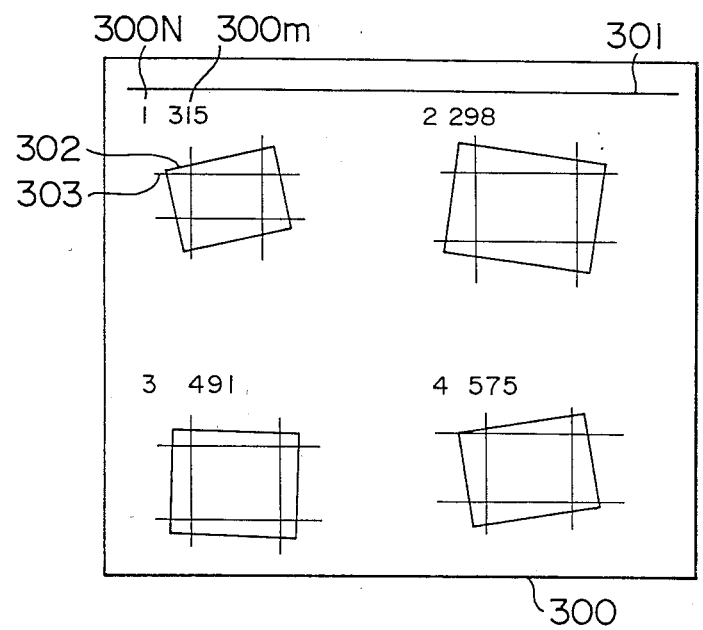
FIG. 9 is a view used to explain the original positioning or arrangement lines and trimming lines drawn on an opaque sheet based on the output position data entered or inputted in the step S9 in FIG. 4.

FIG. 9 shows an opaque sheet upon which are marked the original positioning or arrangement lines and the trimming lines based upon the output position data entered or inputted in the step 9. A reference line 301 is constructed in parallel with one side of the opaque sheet 300 and the original positioning or arrangement lines 302 and the trimming lines 303 of each original are drawn at predetermined positions. The original number 300N and the magnification 300 m are marked at the positions adjacent to their corresponding original positioning or arrangement lines and trimming lines.

When the sheet prepared in the manner described above, the operator can easily paste an original along the original positioning or arrangement lines. In addition, since the trimming lines are drawn, the operator can accurately observe the portions of the original to be trimmed.

When a plurality of originals are pasted over a single sheet as shown in FIG. 9, the original positioning or arrangement lines of respective originals must be so drawn or laid out that they will not overlap with each other. In this embodiment, the layout is accomplished by utilizing the display device as shown in FIG. 7. As described above, the figure A at the position PO can be displaced to the position P1 in a simple manner by operating the keyboard 21. It follows therefore that after an optimum layout is obtained on the screen of the display device 22, a hard copy can be obtained by driving the XY plotter 30 as will be described in more detail hereinafter.

Figure 10:
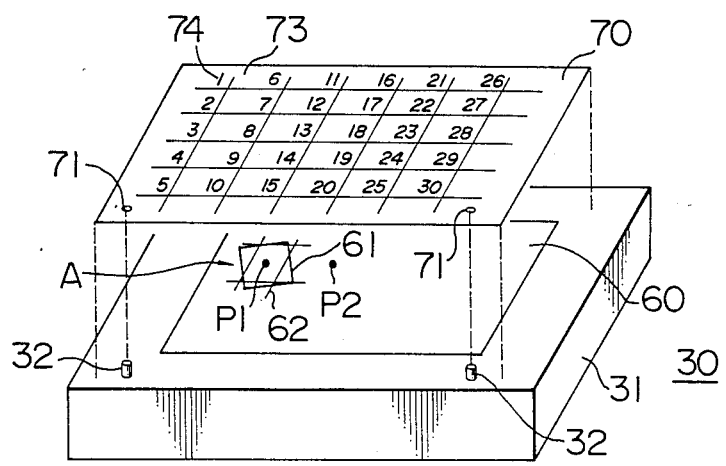
FIG. 10 is a view illustrating means for indicating output positions delivered to an X-Y plotter 30 in the step S7 in FIG. 4.

FIG. 10 is a view used to explain how the abovedescribed layout is obtained. A sheet 60 is placed on a board 31 of the XY plotter 30 and it is assumed that a figure A defined by the copy positioning or arrangement lines or contour lines 61 and the trimming lines 62 is marked at the position P1 at the upper left corner of the sheet 60. Then the XY plotter 30 indicates the output positions of the copy positioning or arrangement lines of the next copy as follows. First, a transparent film 70 is placed over the sheet 60 on the board 31. Grid lines 73 are drawn on the transparent film 70 and the intersections of the grid lines 73 are indicated by the intersection numbers. The transparent film 70 is registered with the board 31 by inserting the positioning pins 32 upwardly extended from the board 31 at the positions in the vicinity of the corners thereof into the mating holes of the transparent sheet or film 70. Thereafter the intersection number of a desired output position P2 is selected and entered or inputted by operating the ten keys on the operation control panel 7 or the keyboard 21.

Figures 11, 12:
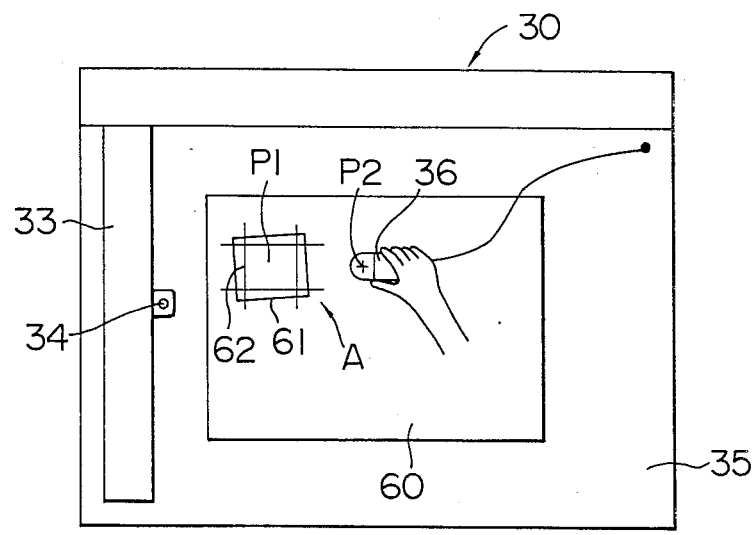
FIG. 11 is a table illustrating the relationships between the intersection numbers 74 shown in FIG. 10 and their coordinates on the X-Y plotter 30.
FIG. 12 is a view illustrating means for indicating the output positions delivered to the X-Y plotter 30 in the step S7 in FIG. 4.

FIG. 11 is a table showing the relationships between the intersection numbers and the coordinates on the XY plotter. The table 80 shown in FIG. 11 shows the X and Y coordinates of the output positions of the XY plotter 30 corresponding to the intersection numbers 74 when the transparent film 70 is placed over the board 31.

After the desired intersection numbers are entered or inputted in the manner described above, the gage output switch on the operation control panel 7 or the keyboard 21 is operated so that the original positioning or arrangement line data and the trimming data derived from the storage in the step S7 are read out and furthermore the coordinate data corresponding to the intersection number entered or inputted in the step S9 is read out from the table 80 which is stored in the storage 23. These data are delivered to the control circuit of the XY plotter 30 so that the latter draws a figure. Thus, a hard copy on which are drawn the original positioning or arrangement lines and the trimming lines entered or inputted in the step S9 is obtained (S10).

When the magnification of the next original is measured, the process is returned from the step S10 to the step S3 and the steps up to the step 10 are accomplished. In this cage, when the output position is entered or inputted in the step S9, the figure defined by the contour lines and trimming lines of an original entered or inputted in the previous operation is marked on the sheet 60 so that the desired output position can be entered or inputted in a simple manner with reference to the figure already marked on the sheet 60.

After the magnification measuring steps of predetermined originals have been accomplished in the manner described above or when no more space is available on the sheet 60 for further marking a pattern in the step S10, the process is terminated (S11) and thus the measuring process is accomplished.

FIG. 12 is a view used to explain how a figure is laid out on the XY plotter 30 which is an XY plotter with a digitizer. That is, the XY plotter 30 comprises a plotting unit 33, a pen 34, a digitizer surface 35 and a cursor 36 and any point on the digitizer surface 35 can be specified by the cursor 36. The sheet 60 is placed over the digitizer surface 35 and the figure A defined by the original positioning or arrangement lines 61 and the trimming lines 62 is marked at the position P1 in the vicinity of the upper left corner of the sheet 60. The output positions of the original positioning or arrangement lines of the next original by means of the plotting unit 33 is entered or inputted by moving the cursor 36 so as to designate a desired position on the digitizer surface 35. For instance, when the cursor 36 designates the position P2 as shown in FIG. 12, the pen 34 draws a figure defined by the original positioning or arrangement lines and the trimming lines as in the case of the figure A in such a way that the center of the figure coincides with the position P2 (S10).

When the magnification of the next original is measured, the process is returned from the step S11 to the step S3 and the steps upto the step S10 are accomplished. In this case, since the pattern defined by the original positioning or arrangement lines (the contour lines) and the trimming lines has been already drawn in the previous process, a desired output position can be easily entered or inputted with reference to the figure already drawn.

When the magnification measuring steps of predetermined originals have been accomplished or when no more space is available on the sheet 60 for further adding a figure in the step S10, the process is terminated (S11).

Another method for accomplishing the layout of the original positioning or arrangement line output positions of each original is such that the sheet 60 is previously divided into a plurality of regions whose coordinates are stored. That is, the sheet 60 is provided with a plurality of frames (divided regions) and each original is outputted or disposed in each frame. The divided regions are numbered and each original is outputted into or disposed in the divided region with a predetermined number. Alternatively, the originals can be layed out in the divided regions in the order of input of the originals. Since the coordinates of each divided region are stored, they may be so utilized that the original number 300N, the magnification 302, the original positioning or arrangement lines 302 and the trimming lines of each original can be marked in a predetermined divided region.

As described above, the diameter of an analyzing drum on which is pasted an original varies in a few steps depending upon a separating magnification of an original. Therefore an embodiment capable of automatically selecting an original based on a magnification will be described below.

FIG. 13 shows the construction of the operation contorl panel 7 shown in FIG. 2. The operation control panel 7 is provided with a menue 90 including ten keys 91, scanner designation commands 92 and other various input commands 93 such as "original number" for entering an original number, "magnification" for entering or inputting a magnification displayed by the magnification indicator 8, "process" for deriving the original positioning or arrangement lines and the trimming lines depending upon a selected analyzing drum and in the order of color separation steps, "C" for clearing the contents, "input" for entering data and "output" for deriving the output from the XY plotter 30. Each command input is accomplished by manipulating the cursor 11.

FIG. 14 shows specification data of scanners stored in the storage 23. The specification data include the magnification 41, the analyzing drum 42 and the size 43 of the mounting sheet. In general, several kinds of analyzing drums are used, but in this embodiment, large, medium and small-sized drums (A scanner) and large and small-sized drums (B scanner) are used. The magnification 41 designates the separating magnification ranges each of which specifies one of the analyzing drums 42 and the size 43 of the mounting sheet indicates the size of a mounting sheet to be attached to a selected drum 42. Thus, as described above, a specific drum is used depending upon a separating magnification. The reason is that since the image read-in rate of a scanner varies in response to a magnification, the image read-in rate is adjusted by changing the diameter of a drum and hence the peripheral speed thereof. The above-described specification data of the scanners are previously stored in the storage 23.

Figure 15:
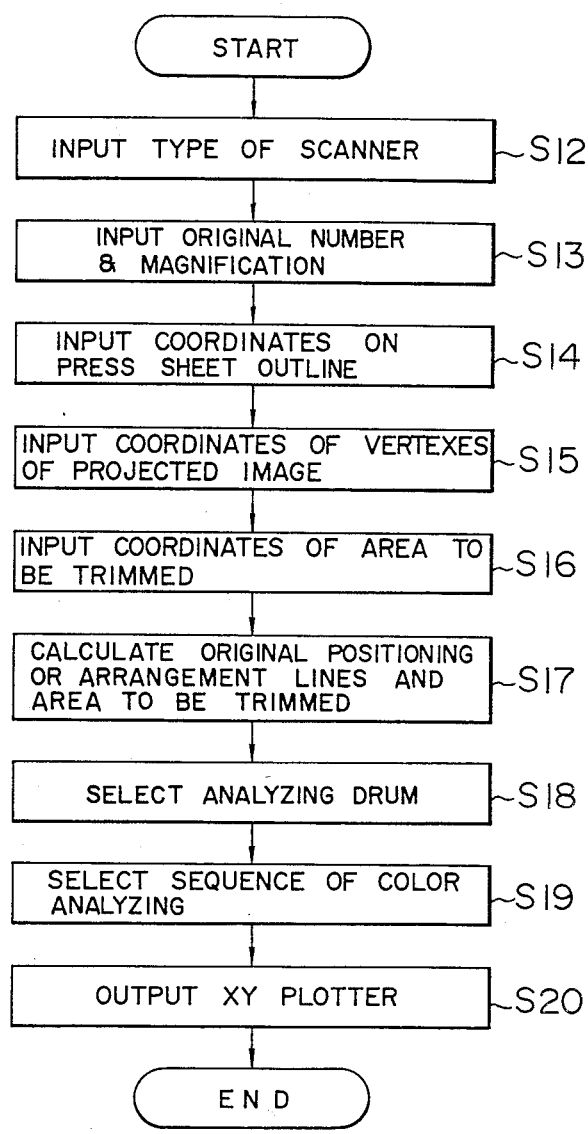
FIG. 15 is a flowchart illustrating the steps accomplished by an arithmetic control device 22 shown in FIG. 3.

FIG. 15 is a flowchart of the process accomplished by the arithmetic control device 22. First, the type of the scanner is entered or inputted by operating the scanner selection command 92 of the menue 90 (See FIG. 13) so that the specification data as shown in FIG. 14 is read out. Next the input command 93 and the ten keys 91 are operated so that the original number and the magnification displayed by the magnification indicator 8 are entered or inputted. Thereafter, the coordinates of the vertexes R1–R4 of the projected image, the coordinates of the points P1 and P2 on the press sheet line and the coordinates of the points Q1–Q4 of an area to be trimmed as shown in FIG. 5 are entered or inputted (S14, S15 and S16). In response to the input data thus entered, the arithmetic control device 22 calculates the original positioning or arrangement line data and the trimming data of each original (S17) and selects one of the analyzing drums based on the table as shown in FIG. 14 (S18).

Thereafter, the "process" command 93 in the menue 90 is entered or inputted. Then, the originals which can be entered or inputted by the same analyzing drum are collected and divided into groups each for each analyzing drum. Next the positions on the original mounting sheet at which are pasted the originals in each group are specified so that the separation order is determined (S19). Next the "output" command 93 is entered or inputted so that the XY plotter starts drawing a figure. As a result, a hard copy on which are drawn the original positioning or arrangement lines and trimming lines of the originals in each group selected in the step S19 is obtained (S20).

The size of the output from the XY plotter 30 can be obtained by calculating the lengths of the adjacent sides Q1Q2 and Q1Q4 of the figure shown in FIG. 6. Assume that the points Q1, Q2 and Q4 have the coordinates (X1, Y1), (X2, Y2) and (X4, Y4), respectively.

Then, $$Q_1Q_2 = \sqrt{(X1 - X2)^2 + (Y1 - Y2)^2}$$

and $$Q_1Q_4 = \sqrt{(X1 - X4)^2 + (Y1 - Y4)^2}$$

Figure 16:
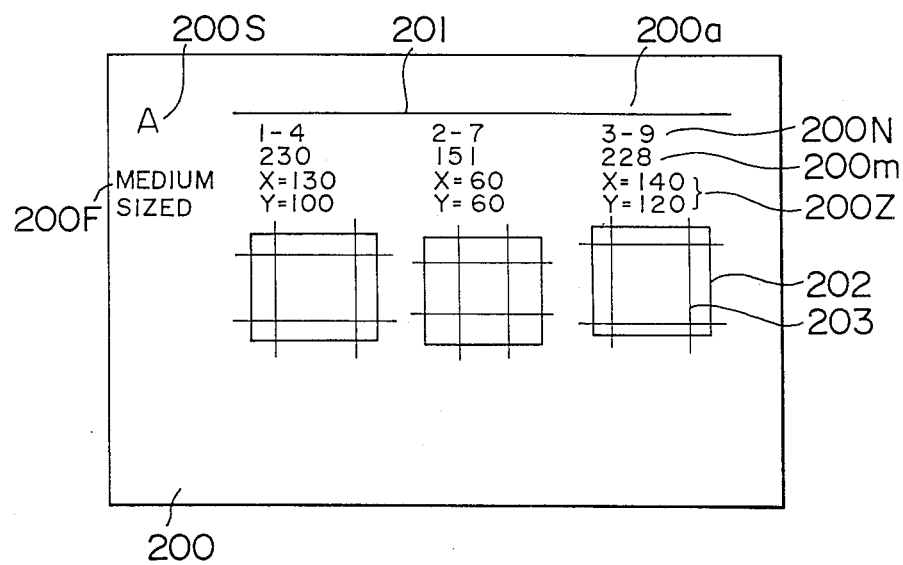
FIGS. 16(a) and (b) are views used to explain the outputs from the X-Y plotter 30 in the step S20.
Figure 16:
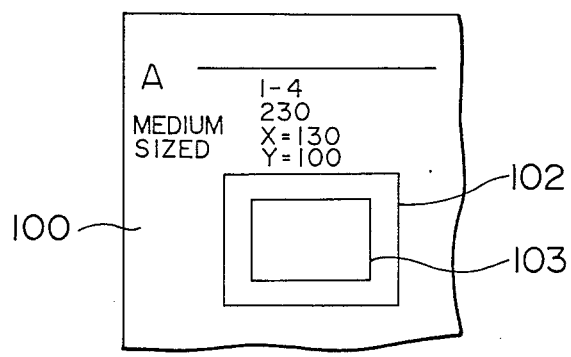

FIGS. 16 are views used to explain the outputs derived from the XY plotter 30 in the step S20. FIG. 16(a) shows an opaque sheet 200 on which is drawn a reference line 201 corresponding to the press sheet outline H in parallel with the upper side of the sheet 200, the type of the scanner 200S to be used and the type of the color analyzing drum 200F to be used at the positions adjacent to the upper left corner of the sheet 200. Furthermore, the original positioning or arrangement lines 202 which define a rectangle are drawn at the center portion of the opaque sheet 200 and the trimming lines 203 defining an area to be trimmed are drawn inside the original positioning or arrangement lines 202 and are extended beyond the four sides of the rectangle defined by the original positioning or arrangement lines 202.

The reason is that when the opaque sheet 200 is cut off along the original positioning or arrangement lines 202, an original is placed into a cutoff portion thus left. The output number 220a, the original number 200N, the magnification 200 m and the resolution size 200Z are marked above the upper original positioning or arrangement line 202. X of the resolution size 200Z designates a size in the axial direction of the drum of an output image while Y, a size in the circumferential direction of the drum of the output image.

FIG. 16(b) shows a transparent sheet 100 which is not cut along the original positioning or arrangement lines as in the case of the opaque sheet 200 so that the trimming lines which define a rectangle are drawn within the rectangle defined by the original positioning or arrangement lines 102.

The mounting sheet on which are marked the data, positioning or arrangement lines and trimming lines of each original for the same color analyzing drum is delivered to a scanner operator together with the originals. Then the scanner operator only pastes the originals on the mounting sheet and the data of the originals which use the same color analyzing drum and which are accurately trimmed are sequentially stored into the magnetic disk device 162 shown in FIG. 1.

Figure 1:
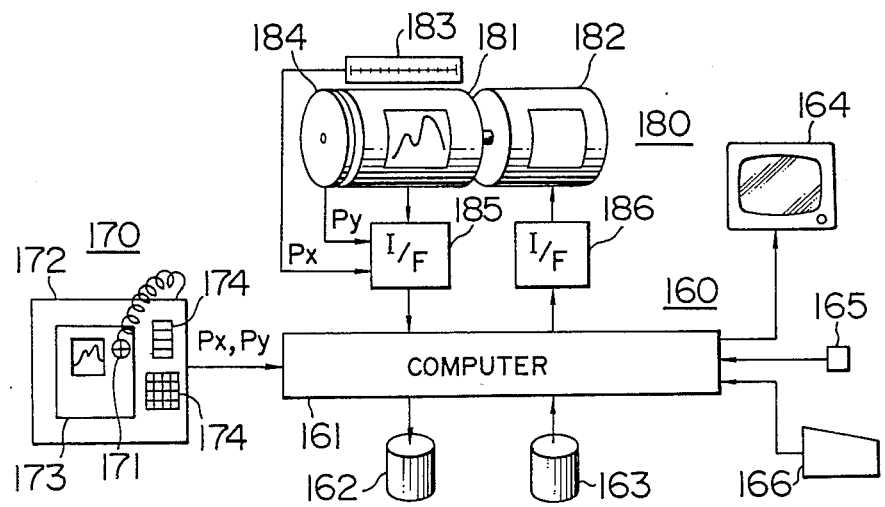
FIG. 1 is a schematic view illustrating the construction of a conventional electronic page make-up system.
Figures 17, 19:
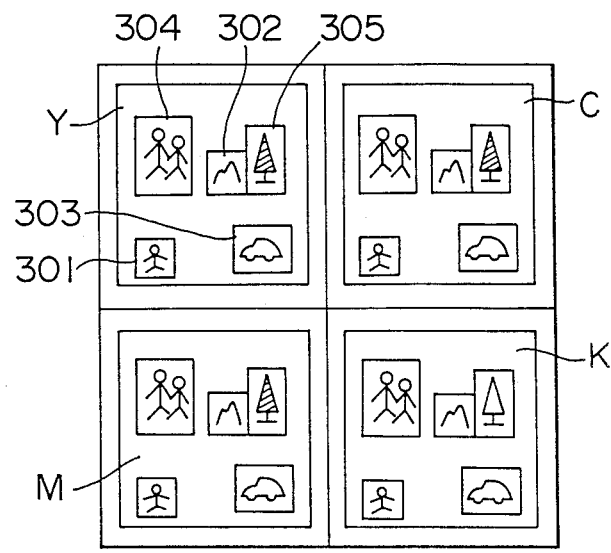
FIG. 17 is a view illustrating picture data which have been paged by the computer 60 and focused or exposed on a film.
FIG. 19 shows a menue illustrating the inputs required for accomplishing the steps as shown in FIG. 18.

FIG. 17 shows the picture data exposed on a film after the picture data stored in the magnetic disk device 162 are read out and paged by the computer 161 shown in FIG. 1. In FIG. 17, the picture images 301, 302 and 303 have magnifications less than 200% so that they are entered or inputted by means of the large-sized drum of the A scanner as shown in FIG. 14 while the picture images 304 and 305 have magnifications ranging from 201 to 600% so taht they are entered or inputted by means of the medium-size drum of the A scanner as shown in FIG. 14. In response to the picture image paged by the computer 60 as shown, color separated images Y, M, C and K are obtained in the form of a two-by-two matrix. As described above, the mounting sheet upon which are pasted the originals for each color analyzing drum can be automatically obtained so that the cumbersome process for selecting the originals can be eliminated.

Figure 18:
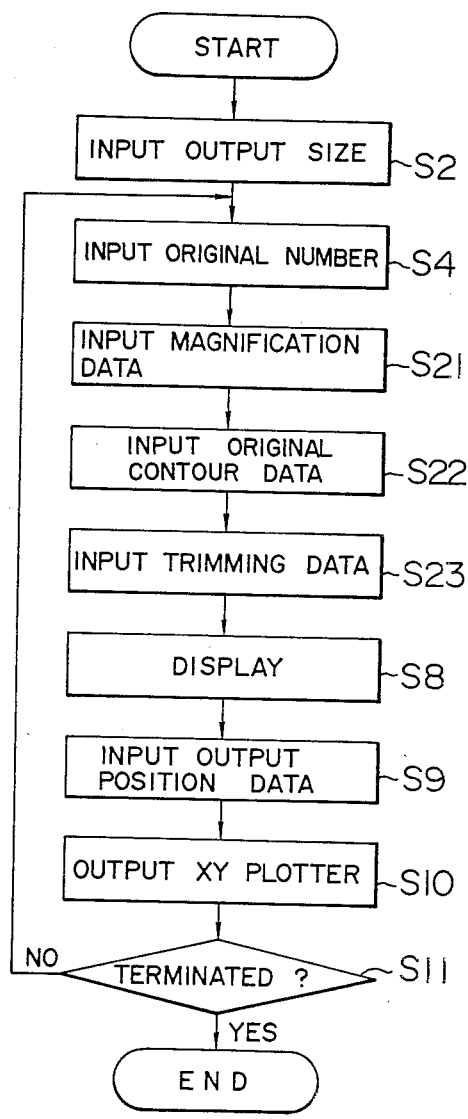
FIG. 18 is a flowchart illustrating the steps accomplished by the arithmetic control device 22 when the numerical data of each original is inputted or entered.

In the embodiments described above, the magnification measurement and the input of the position data of each original are accomplished by the data tablet 10. Therefore when the data (magnification data, original contour data and trimming data) of each original is entered or inputted by the data tablet 10 and then stored, these data can be entered or inputted directly in the form of numerical data in the next process as will be described in detail with reference to FIG. 18 and in comparison with the flowchart shown in FIG. 4.

First, in the step S2 the output size is entered or inputted and then the original number is keyed in in the step 4. According to this embodiment, it is not needed to place an original on the data tablet 10 so that the step (S1) of setting a layout sheet as shown in FIG. 4 can be eliminated. For the same reason, the step (S3) of setting an original can be eliminated. In the case of the process as shown in FIG. 4, the step (S5) of measuring a magnification on the data tablet 10 and the step (S6) of enterring or inputting the position data are accomplished, but according to this embodiment, the previously entered or inputted data per se are used so that the magnification data input (S21), the contour data input (S22) and the trimming data input (S23) can be directly entered or inputted in the form of numerical values. In order to effect the input of numerical values, a menue 94 shown, for instance, in FIG. 19 is attached to the data tablet 10. When the original number 95, the magnification 96, the original contour 97 and the trimming data 98 are designated, the data to be entered or inputted is selected and the actual numerical data is entered or inputted by using the ten keys 99. The succeeding steps S8–S11 are substantially similar to those shown in FIG. 4.

It is apparent that the mounting sheet prepared by the apparatus in accordance with the present invention is used not only for improving the operation efficiency of the electronic page make-up system but also for improving the operation efficiency of a conventional scanner which is not connected to a computer.

As described above, according to the present invention, in the case of the measurement of a magnification of an original, the position data of an original mounting sheet B and a projected image I of the original are entered or inputted on the data tablet 10 and the original positioning lines and the trimming lines are once displayed at a predetermined area of the screen of the display device so that the output positions on the mounting sheet are specified. As a result, a sheet on which are drawn the original positioning or arrangement lines and the trimming lines defining an area to be trimmed can be obtained. Therefore, the efficiency of the step for pasting the originals on the input drum of the scanner can be remarkably improved. Furthermore, since the cumbersome process for determining an area to be trimmed is not accomplished on the screen of the display device, the determination of an area to be trimmed can be accomplished with a higher degree of accuracy and the image make-up process in the electronic page make-up system can be accomplished also with a higher degree of efficiency. In addition, the original positioning or arrangement lines and the trimming lines can be drawn at the desired positions on the mounting sheet without leaving any dead space so that the magnification measuring process as well as the color separation process by the scanner can be carried out with a higher degree of efficiency. As a result, the operation efficiency of the electronic page make-up system can be remarkably improved.

In addition, the mounting sheet on which are collectively pasted the originals for each color analyzing drum to be used can be prepared so that the steps for selecting the originals and determining the sequence of color separation steps which must be previously carried out before the originals are pasted on the mounting sheet can be eliminated. Thus, the operation efficiency of the electronic page make-up system can be remarkably improved.

What is claimed is:

1. In an apparatus for preparing a sheet upon which an original having an image is pasted and which is used in a system in which said sheet is fed to a scanner so that said original is scanned and read out, an apparatus for preparing a mounting sheet of originals to be scanned comprising:
   means for inserting an original into an optical system so as to focus the image of said original on a layout sheet and making said image to coincide or register with a rough sketch on said layout sheet, thereby obtaining a magnification data of said image relative to said original;
   a data tablet for entering or inputting a position data of a reference line and said image on said layout sheet;
   arithmetic control means for accomplishing arithmetic operations based on said magnification data and said position data, thereby deriving or outputting original positioning lines and data representing an area to be trimmed; and
   sheet output means for delivering or outputting a sheet upon which are drawn said original positioning or arrangement lines and an area to be trimmed in response to the output from said arithmetic control means.

2. An apparatus for preparing a mounting sheet of originals to be scanned as set forth in claim 1 characterized in that said sheet output means includes a plotter or drawing device for plotting or drawing the original positioning or arrangement lines and the areas to be trimmed of a plurality of originals on a single sheet and a device for specifying the position of each original to be plotted or drawn.

3. An apparatus for preparing a mounting sheet of originals to be scanned as set forth in claim 2 characterized in that said plotter or drawing device is an XY plotter.

4. An apparatus for preparing a mounting sheet of originals to be scanned as set forth in claim 2 characterized in that said device for specifying the position of each original to be plotted or drawn includes indicating means for indicating a plotting or drawing position and input means for indicating an adjustment of said plotting or drawing position.

5. An apparatus for preparing a mounting sheet of originals to be scanned as set forth in claim 4 characterized in that said indicating means is a cathode-ray tube display device and said input means is a keyboard.

6. An apparatus for preparing a mounting sheet of originals to be scanned as set forth in claim 4 characterized in that said indicating means includes means for dividing an output surface of the sheet into a plurality of regions and attaching reference codes to respective divided regions and said input means includes means for entering or inputting said reference codes and means for specifying a plotting or drawing position in response to a reference code entered or inputted.

7. An apparatus for preparing a mounting sheet of originals to be scanned as set forth in claim 6 characterized in that means for specifying said reference codes comprises a transparent film upon which are drawn boundary lines defining a plurality of divided regions and reference codes in the divided regions defined by said boundary lines.

8. An apparatus for preparing a mounting sheet of originals to be scanned as set forth in claim 2 characterized in that said indicating means includes a coordinate input means for entering or inputting the coordinates of the positions on the output surface of the sheet.

9. An apparatus for preparing a mounting sheet of originals to be scanned as set forth in claim 3 characterized in that said indicating means includes a digitizer disposed in coplanar relationship with a plotting surface of said XY plotter.

10. An apparatus for preparing a mounting sheet of originals to be scanned as set forth in claim 1 characterized in that said arithmetic control means is capable of dividing a plurality of originals into groups depending on the magnification data of respective originals and delivering or outputting the data of each group and said sheet output means is capable of drawing the original positioning or arrangement lines and the areas to be trimmed on a separate sheet for each group.

11. An apparatus for preparing a mounting sheet of originals to be scanned as set forth in caim 1 characterized in that said sheet output means includes plotting or drawing means for plotting or drawing the original positioning or arrangement lines and the area to be trimmed of each of a plurality of originals on a single sheet and storage means for storing the coordinates of each of a plurality of divided regions resulting from the division of said sheet, whereby in response to said coordinates the original positioning or arrangement lines and the area to be trimmed of each original are specified in each divided region and delivered or outputted.

12. An apparatus for preparing a mounting sheet of originals to be scanned as set forth in claim 11 characterized in that said sheet output means includes input means for specifying a divided area into which are outputted the original positioning or arrangement lines and the area to be trimmed of each original.

13. An apparatus for preparing a mounting sheet of originals to be scanned as set forth in claim 11 characterized in that said sheet output means specifies each divided region in which are drawn the original positioning or arrangement lines and the area to be trimmed of each original, in the order of input of originals.

14. An apparatus for preparing a mounting sheet of originals to be scanned as set forth in claim 1 characterized in that said data tablet has a ten-key region and enters or inputs the position data in the form of a numerical value.

15. An apparatus for preparing a mounting sheet of originals to be scanned as set forth in claim 1 characterized in that said arithmetic control means includes means for entering or inputting the magnification data directly from the exterior and is capable of accomplishing an arithmetic operation in response to said magnification data directly entered or inputted.

* * * * *